March 11, 1969 R. G. HUSA 3,432,682
TRIGGERED VOLT-SECOND GENERATOR
Filed March 4, 1965

INVENTOR.
Ronald G. Husa
BY
Roland A. Anderson
Attorney

United States Patent Office 3,432,682
Patented Mar. 11, 1969

3,432,682

TRIGGERED VOLT-SECOND GENERATOR

Ronald G. Husa, Albuquerque, N. Mex., assignor, by mesne assignments, to the United States of America as represented by the United States Atomic Energy Commission Filed Mar. 4, 1965, Ser. No. 437,331
U.S. Cl. 307—88 1 Claim
Int. Cl. H03k 3/45

ABSTRACT OF THE DISCLOSURE

An electrical circuit for repetitively producing an output pulse with given volt-second area from a source of input pulses of variable wave shape and pulse width in which a square loop saturable reactor core primary is repetitively switched between its opposite saturation states through separate capacitor charging and discharging circuits, each of which includes the core primary. A silicon controlled rectifier in the capacitor discharge circuit is triggered by an input pulse to initiate core switching and is thereafter provided with necessary latching current to sustain capacitor discharge whereby output pulses are generated whose volt-second area is determined by the core characteristics and number of turns on the primary.

This invention relates generally to electrical circuits adapted to produce repetitively an output voltage pulse of specified characteristics from a source of input pulses. More particularly, it relates to a circuit of this type in which the volt-second area of each individual output pulse can be maintained substantially constant at a value determined solely by the characteristics and physical parameters of a saturable core reactor.

A circuit with such capability is particularly useful in driving a magnetic counting circuit. In such a circuit a saturable core must be magnetized in a series of equal increments. For a given saturable core one can calculate the amount of magnetic flux required to step the core through a certain flux increment between its negative saturation state and its positive saturation state. In order that the proper increment of flux be introduced, the volt-second area of a unidirectional magnetizing pulse must be known and controlled precisely.

Other uses of a repetitive pulse of controlled volt-second area may involve driving a saturable core from one saturation state to an opposite one in a single step as, for example, in the operation of a shift register. Here the important consideration is to maintain pulse width within certain limits. With a pulse amplitude established by means of a regulated power supply, a circuit of the type to be described will yield output pulses of such controlled pulse width.

Prior art circuits most nearly comparable to the circuit of this invention are subject to one or more disadvantages. Perhaps the most important of these is their reliance on a certain input wave shape for triggering. For example, one prior art pulse forming circuit designed to produce an output pulse of constant volt-second area depends for its operation on driving a saturable core substantially beyond the "knee" of the initial saturation level in order to trigger a blocking oscillator switch with a "kick back" voltage and thereby produce a squrae wave output pulse. This type of circuit employs a transistor forming part of the capacitor discharge circuit which conducts in response to an input voltage pulse causing the capacitor to discharge through a core winding. Until it reaches saturation, the collector-to-emitter resistance of a transistor can be appreciable. Thus if any substantial time lag occurs in reaching transistor saturation the capacitor will not drive the core hard enough to cause a flux excursion well beyond the "knee," and the blocking oscillator will not be triggered. Therefore, such a circuit requires a substantially square wave input pulse. This is clearly a shortcoming since the original pulse may have a different shape, for example, a triangular clock pulse, which must first be converted to a square wave before being applied to the pulse forming circuit. Other prior art circuits of this general type which avoid the inherent difficulties of a transistor as described above still require that a blocking oscillator be triggered and involve the above described flux excursion beyond the loop saturation level. Such circuits depend upon critical component values in order to enable the correct circuit operation, and the circuit time constants cannot be made compatible with higher frequency operation.

It is a general object of the present invention to provide circuit means for producing repetitively an output pulse with given volt-second area with a simple, highly efficient design.

It is a more specific object of the invention to provide circuit means of such type wherein proper operation is independent of the shape or duration of the input pulse.

It is a further object of the invention to provide circuit means of the type to be described wherein operation is not dependent upon the selection of components of critical value.

The circuit of this invention employs a saturable reactor core of substantially rectangular hysteresis loop, the core being linked with primary and secondary windings. The primary winding is connected to a capacitor charging circuit which is adapted to drive the core from a first saturation state to a second state of opposite polarity. This charging circuit is energized from a D.C. voltage source during the period of conduction of an N-P-N transistor, which occurs during the interval between input pulses to the circuit. Resistive means are provided to furnish proper base current for saturation of the transistor during the charging cycle. A source of positive input pulses, which may be of random shape and pulse width, is connected to the gate electrode of a silicon controlled rectifier, which forms the basic switching means of the circuit. When the rectifier is triggered into conduction by an input voltage of sufficient amplitude, It furnishes a path to ground for the base of the transistor such that it is cut off and the charging circuit is disabled. In this conducting state the rectifier also completes a discharge path for the capacitor of the charging circuit which includes the primary winding of the saturable core. This discharging circuit applies a voltage pulse to the primary winding which drives the core back to its first saturation state. The rectifier is connected resistively to the source of direct current voltage and has a holding or latching current above that furnished from that source. Suitable resistor means connected between the gate electrode and cathode of the rectifier are provided for controlling its holding current. Resistor means are also provided in parallel with the primary core winding to maintain the current in the capacitor discharge circuit above the rectifier holding current until the core is returned to its first or quiescent saturation state. Finally, the secondary winding linking the core is connected to any suitable output circuit whereby output pulses of constant volt-second area are generated in response to the repetitive switching of said core between its two saturation states.

Other objects, features, and advantages of the invention will become apparent from the following description taken in conjunction with the accompanying drawings, in which.

Figure 3:
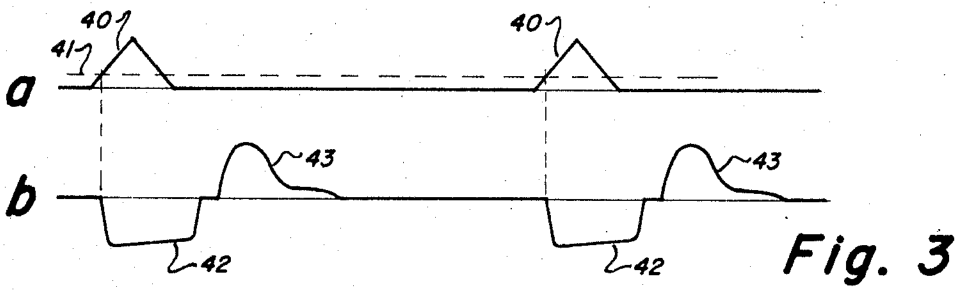
Figure 4:
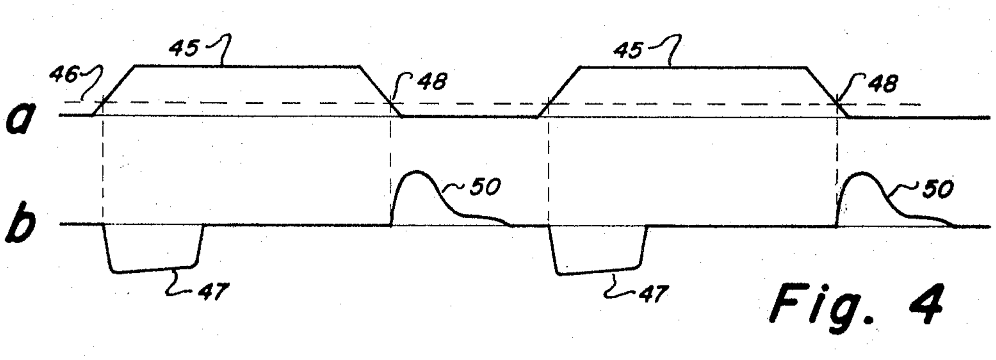

FIG. 3, graphs *a* and *b*, illustrate, respectively, an initial input voltage in triangular form and the voltage pulses formed at the circuit output responsive thereto;

FIG. 4, graphs *a* and *b*, illustrate, respectively, an initial input voltage having a trapezoidal form and the voltage pulses formed at the output of the circuit corresponding thereto.

Figure 1:
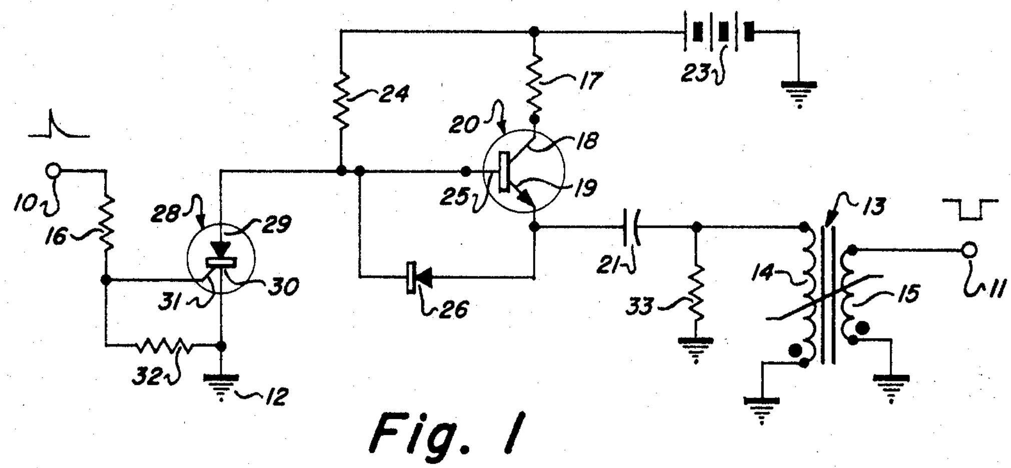
FIG. 1 is a circuit diagram of a pulse generating circuit incorporaing the invention.

The pulse generating circuit shown in FIG. 1 is provided with an input terminal 10, an output terminal 11, and a common ground 12. The wave form shown at input terminal 10 is illustrative of any positive-going input pulse of undetermined form and duration, while the wave form shown at output terminal 11 illustrates any negative-going square wave pulse of controlled volt-second area. Subsequent figures illustrating these pulses in detail will be discussed in connection with the circuit operation. A saturable core 13 of known characteristics and parameters having a substantially rectangular hysteresis loop is provided with a primary winding 14 and a secondary winding 15 shown, for example, in FIG. 1 as having like polarity although for particular purposes an opposite polarity may equally well be selected. Primary winding 14 forms part of a charging circuit through which the initial switching or setting of core 13 takes place. This charging circuit includes resistor 17, collector 18, and emitter 19 of N-P-N transistor 20, and capacitor 21 which together complete the charging path between D.C. voltage source 23 and common ground 12. Necessary base current for saturation of transistor 20 is provided through resistor 24 which is connected between base 25 of transistor 20 and voltage source 23. A diode 26 is connected between emitter 19 and base 25 and oriented to permit current flow between these two electrodes when transistor 20 is cut off.

Conveniently located with respect to input terminal 10 is a silicon controlled resistor 28 having an anode 29, a cathode 30, and gate electrode 31. Gate electrode 31 is connected to terminal 10 through current limiting resistor 16 and is also connected through resistor 32 to cathode 30 which is, in turn, connected to common ground 12. Anode 29 is directly connected to base 25 of transistor 20 at its junction with resistor 24. The capacitor discharging circuit is now observed to include (in addition to primary winding 14 and capacitor 21) diode 26, rectifier 28, and common ground 12. A resistor 33 in parallel with primary winding 14 also forms a part of the discharge circuit, whose function will be shortly apparent.

In operation, when the circuit is energized and with no input signal applied on input terminal 10, core 13 is switched from one saturation state to its opposite, for example, a positive saturation state to a negative saturation state. This is accomplished in response to the charging of capacitor 21 through the circuit described above which furnishes the necessary pulse to core 13 through primary 14. Transistor 20, which conducts during the charging of capacitor 21, should be operated with a saturating base current. This will be achieved provided the value of resistor 24 is equal to or less than the value of resistor 17 multiplied by the minimum gain of transistor 20. In addition, the time constant established by resistor 17 and capacitor 21 is selected so that capacitor 21 will have time enough to charge to approximately the value of source voltage 23 between input pulses. Resistor 17 must also be small enough to furnish sufficient magnetizing current for core 13, while capacitor 21 is chosen so that it can supply this current at least for the length of time required to saturate core 13. These are obvious design considerations. In order to select this time it is not necessary that the source of input pulses be of constant frequency. All that is required is a knowledge of the maximum repetition rate to be experienced. This relationship will be made clear from an examination of subsequent figures.

Figure 2:
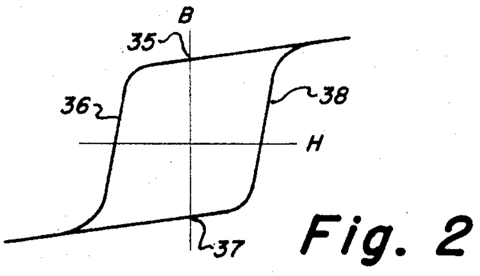
FIG. 2 illustrates a typical saturable core hysteresis loop as it relates to the charge and discharge cycles to be described.

The operation of the capacitor charging circuit will be better understood from an examination of a hysteresis loop idealized in FIG. 2, which may be considered applicable to core 13. If the circuit is energized when core 13 is in a positive saturation state 35, the charging of capacitor 21 will cause the core to switch along path 36 as indicated to its negative saturation state 37. Upon application of a positive-going input pulse at input terminal 10 of sufficient amplitude, rectifier 28 will be triggered into conduction through gate electrode 31. Previously current supplied to rectifier 28 has been limited to a value below its holding current by proper selection of the value of resistor 24. When rectifier 28 conducts, it furnishes a path to ground for base 25 of transistor 20 and cuts off transistor 20, preventing capacitor 21 from charging. At the same time, rectifier 28 completes a discharge path for capacitor 21 through diode 26 to common ground 12 and back through primary winding 14. Rectifier 28 switches very rapidly upon application of the trigger pulse. This is totally independent of the shape of the input voltage pulse or of its duration. The result is that the supply voltage 23 is seen almost instaneously across primary winding 14 and correspondingly across secondary winding 15. However, it is necessary to insure that rectifier 28 does not fail to conduct during the switching of core 13 from its negative saturation state 37 back to its positive saturation state 35. To provide for the situation in which rectifier 28 is not maintained in conduction at this time by the input pulse, resistor 33 is inserted in parallel with primary winding 14 to provide a low impedance current path. Examination again of FIG. 2 shows the switching path 38 of core 13 in response to the discharge of capacitor 21.

During the switching of core 13 in response to the successive charging and discharging cycles of capacitor 21, output pulses are generated at terminal 11. For better appreciation of the relationship of the input and output pulses, reference is now made to FIGS. 3*a*, 3*b*, 4*a*, and 4*b*. FIG. 3*a* shows a triangular input voltage pulse 40 of some known maximum repetition rate. At a level of rising voltage represented by dotted line 41 intersecting voltage pulse 40, rectifier 28 will be triggered. This at once permits the discharge of capacitor 21 to proceed with the resultant switching of core 13 from negative to positive saturation state. As rectifier 28 triggers, the voltage across primary 14 rises rapidly to the source potential 23. Momentarily core 13 appears as a high impedance and the voltage across primary 14 decays on a long time constant exponential giving a slightly decreasing but substantially square pulse top. As core 13 reaches its positive saturation state, its impedance falls very rapidly and the voltage decays through primary winding 14 very rapidly on a relatively short time constant exponential to form a sharply falling trailing edge. This pattern is duplicated in inverse form in secondary winding 15. FIG. 3*b* shows such a negative-going output pulse 42 with rapidly rising leading edge coincident with the triggering of rectifier 28, substantially flat pulse top during capacitor discharge, and sharply falling trailing edge at core saturation. It should be understood that the voltage wave form at secondary winding 15 is the same as the output voltage at terminal 11.

As the current through the discharge circuit of capacitor 21 falls below the holding current of rectifier 28, it ceases to conduct, allowing transistor 20 once again to conduct and permitting the charging of capacitor 21 to begin. Looking at the output wave form on FIG. 3*b*, as the trailing edge of pulse 42 approaches a zero voltage line, it is noted that a short delay occurs before the positive-going pulse 43 which accompanies the charging of capacitor 21. This delay is explained by the small finite time required for "turn-off" of rectifier 28 and because current is still flowing in the capacitor discharge circuit.

It is noted that the shape of positive pulse 43 is different from that of negative-going pulse 42 because core 13 is not driven as hard in progressing from negative saturation state 37 to positive state 35 as it is in the opposite direction. Nonetheless its volt-second area is substantially the same since it is controlled by the characteristics of core 13 and number of turns on its windings.

It is important, as shown in FIG. 3*b*, that positive-going pulse 43 has fallen to zero value before the arrival of the next input pulse 40 at which time the process is repeated. Proper selection of the time constant determined by the value of capacitor 21 and resistor 17 with due regard to the maximum repetition rate expected for input pulse 40 will insure that this effect is achieved. It should be noted at this point that the available gain of transistor 20 enables the circuit designer to keep resistor 17 small and yet provide a much larger value for resistor 24 in order to limit the current supplied to rectifier 28.

If the input pulse takes the form of a trapezoidal pulse of long duration as in FIG. 4*a*, then it will be noted as before that rectifier 28 triggers when the necessary threshold voltage 46 has been reached. The width of corresponding negative output pulse 47, as in the example of FIGS. 3*a* and 3*b*, is again governed by the characteristics of core 13, and for purposes of illustration is shown terminating well ahead of the trailing edge of input pulse 45. The mechanism whereby negative-going output pulse 47 is produced is exactly the same as previously described. This establishes an important feature of the circuit, namely, that the output is totally independent of the characteristics of the input pulse. As long as input pulse 45 persists at a voltage level above the triggering threshold, rectifier 28 conducts and furnishes a path to ground for base 25 of transistor 20, thus cutting off transistor 20 and preventing capacitor 21 from charging even though core 13 has reached positive saturation. When input pulse 45 decays to a value below that sufficient to sustain conduction of rectifier 28 at, for example, point 48, charging of capacitor 21 begins and we again have the corresponding positive-going output pulse 50 whose form is identical to that of pulse 43 in the example of FIGS. 3*a* and 3*b*. Here it is seen that if the RC time constant of the charging circuit is rapid enough to permit the charging cycle to be completed before the arrival of the next pulse 45, there will be ample time in the event of any shorter input pulse. Thus the only frequency information required concerning the source of input pulses is the maximum repetition rate to be experienced.

If variations should occur in the value of the supply voltage 23, there will be no effect upon the volt-second area under either the positive- or negative-going output pulses. As the pulse amplitude decreases, the pulse width will increase correspondingly, and vice versa. It is therefore apparent that the negative-going pulses at output 11 will maintain a uniform volt-second area dependent only upon the characteristics of core 13 and the number of turns on primary winding 14. When power supply 23 is carefully regulated, the output pulses will in addition have a constant pulse width. It may be noted that where temperature increase tends to vary the characteristics of a saturable core to which the output pulses of this circuit are applied, this same temperature increase will affect core 13 of the present circuit in a compensating manner.

In order to illustrate practical values which may be incorporated in the components of a circuit in accordance with this invention, the following table has been set forth.

It will be understood that such values are illustrative only and are in no sense to be regarded as a limitation upon the scope of this invention.

| Element: | Value or type |
|---|---|
| 13 | 117P250–42 (Arnold). |
| 14 | 100 turns. |
| 15 | 30 turns. |
| 16 | 1.1K ohms (5 volt input pulse). |
| 17 | 1.3K ohms. |
| 20 | 2N956. |
| 21 | .1 microfarad. |
| 23 | +20 volts. |
| 24 | 43K ohms. |
| 26 | FD200. |
| 28 | 2N2680. |
| 32 | 330 ohms. |
| 33 | 2K ohms. |

In the example given above, since primary winding 14 has 100 turns, one can calculate the corresponding pulse width from the formula:

$$N=\frac{E\cdot T\cdot 10^8}{2B_m A_c}$$

where:

N=number of turns on primary 14,
E=magnitude of charge on capacitor 21,
T=pulse width in microseconds,
$B_m$=magnetic core induction in gauss,
$A_c$=cross-sectional core area in square centimeters.

For example, in a core in which $B_m$=7500 gauss and $A_c$= .00806, as in the type listed in the table above, the pulse width is 6 microseconds. This pulse width is maintained on the output pulse across secondary 15 and thus the requisite volt-second area is established. If supply voltage 23 should increase, it is obvious that the pulse width on primary 14 and secondary 15 would decrease and the volt-second area would remain constant. A similar variation in the opposite direction would occur for a decrease of supply voltage 23. If it is desired that the pulse amplitude on secondary 15 and output 11 be greater or less than that on primary 14, a step up or step down turns ratio can be employed without affecting the pulse width on the output pulse. In the example the output pulse amplitude will be in the ratio of 3/10 to source voltage 23 or approximately 6 volts.

In summary, it should be reemphasized that proper operation of the circuit of this invention is independent of the form or duration of the repetitive input pulse. All that is required is that the input voltage reach the necessary threshold for triggering rectifier 28 and that the maximum repetition rate of such input pulses bear a known relation to the RC time constant of the charging circuit of capacitor 21. The holding current of rectifier 28 is not critical as long as it is above the value supplied from source voltage 23 in the quiescent state. It is obvious that a P-N-P transistor could be substituted for transistor 20 with appropriate changes in polarities. It is also readily apparent that if a positive-going square wave pulse is desired at output terminal 11, a simple reversal of polarity in windings 15 will accomplish this result.

What is claimed is:

1. An apparatus for repetitively producing an output pulse with given volt-second area from a source of positive input pulses of variable wave shape and pulse width comprising:

a saturable reactor core having a substantially rectangular hysteresis loop, said core being linked by primary and secondary windings;

a source of direct current voltage;

an N-P-N- transistor having a base, an emitter and a collector, said collector being connected through a first resistor to said source of direct current voltage, said emitter being connected through a capacitor to one terminal of said primary winding to form a charging circuit including said primary winding adapted to drive the core from a first saturation state to a second saturation state, said base being connected through a second resistor to said source of direct current voltage to furnish base current sufficient to saturate said transistor;

a silicon controlled rectifier having an anode, a cathode and a gate electrode, said anode being connected to the base of said transistor, said cathode being connected to a common ground with the other terminal of said primary winding, and said gate electrode being connected resistively to said source of input pulses, the value of said source resistor being chosen to limit the current through said rectifier to less than its holding current;

a diode connected between said emitter and base and oriented to complete a capacitor discharging circuit including said rectifier and said primary winding adapted to drive the core from its second saturation state to its first saturation state;

a third resistor connected in parallel with said primary winding to maintain the current in said discharging circuit above the rectifier holding current until the core is driven to its first saturation state;

said secondary winding being connected to an output circuit whereby output pulses of constant volt-second area are generated in response to the repetitive switching of said core between its first and second saturation state.

References Cited

UNITED STATES PATENTS

| | | | |
|---|---|---|---|
| 3,221,176 | 11/1965 | Fritz | 307—88 |
| 2,995,731 | 8/1961 | Sweeney | 340—174 |

JAMES W. MOFFITT, *Primary Examiner.*

U.S. Cl. X.R.

307—270